United States Patent [19]
Murata et al.

[11] Patent Number: 4,723,762
[45] Date of Patent: Feb. 9, 1988

[54] APPARATUS FOR SEALING THE SKIRT OF A CONVERTER WASTE GAS RECOVERY SYSTEM

[75] Inventors: Toyo-o Murata, Katakyushu; Masao Kimoto, Sakai; Mazumi Nishikawa, Yokosuka; Nobuyuki Fujikura, Yotsukaido, all of Japan

[73] Assignees: Nippon Steel Corporation; Kawasaki Jukogyo Kabushiki Kaisha, both of Japan

[21] Appl. No.: 900,742

[22] Filed: Aug. 27, 1986

[30] Foreign Application Priority Data

Aug. 30, 1985 [JP] Japan .................. 60-191083

[51] Int. Cl.⁴ .................. C21C 5/38; C21B 7/22; F16J 15/00
[52] U.S. Cl. .................. 266/158; 277/12; 277/135
[58] Field of Search .................. 277/12, 32, 58, 126, 277/127, 135; 432/115, 116; 55/355, 502, DIG. 30; 49/484; 266/158

[56] References Cited

U.S. PATENT DOCUMENTS

| | | |
|---|---|---|
| 2,954,244 | 9/1960 | Austin .................. 266/158 X |
| 3,396,958 | 8/1968 | Maehara et al. .................. 266/158 |
| 3,724,827 | 4/1973 | Dortenzo .................. 266/158 X |
| 3,799,520 | 3/1974 | Hegemann et al. .................. 266/158 |
| 3,814,402 | 6/1974 | Manbon .................. 266/158 X |
| 4,076,223 | 2/1978 | Schempp .................. 266/158 |
| 4,078,777 | 3/1978 | Mearns et al. .................. 266/158 |
| 4,111,405 | 9/1978 | Krelis et al. .................. 266/158 |

FOREIGN PATENT DOCUMENTS

| | | |
|---|---|---|
| 51-70104 | 6/1976 | Japan .................. 266/158 |
| 52-32606 | 8/1977 | Japan .................. 266/158 |
| 5838755 | 1/1985 | Japan . |
| 58103201 | 5/1985 | Japan . |
| 60-33162 | 8/1985 | Japan .................. 266/158 |

Primary Examiner—Allan N. Shoap

[57] ABSTRACT

A device for sealing the skirt of a converter waste gas recovery system is disclosed, which comprises a primary sealing apparatus adapted to enclose the converter mouth and mounted along the skirt along a lower edge thereof, a secondary sealing apparatus adapted to encircle about the primary sealing apparatus, and primary hydraulic cylinder for vertically moving the skirt together with the primary sealing apparatus, and a secondary hydraulic cylinder for vertically moving the secondary sealing apparatus independently of the primary sealing apparatus. The primary sealing apparatus is intended to provide sealing for the gap between the skirt and the converter mouth. The secondary sealing apparatus serves to insure sealing when the primary sealing apparatus has failed to provide proper sealing because of adhered slag along the rim of the mouth from prolonged operations. Either or both of the sealing apparatuses include a sealing jacket adapted to enclose the skirt and filled with water and a sealing plate built to extend along the sealing apparatus and mounted to have its lower portion submerged into the water in the sealing jacket for sealing and cooling the respective sealing apparatus in the heat generated by the converter.

5 Claims, 6 Drawing Figures

APPARATUS FOR SEALING THE SKIRT OF A CONVERTER WASTE GAS RECOVERY SYSTEM

BACKGROUND OF THE INVENTION (1) Field of the Invention

This invention relates to an apparatus for sealing the skirt of recovery systems which collects the valuable gas from an oxygen blowing converter.

(2) Description of the Prior Art

Oxygen blowing converters generate large quantities of waste gases rich in CO content during the refining of metals by pure oxygen blowing. It is well known to collect such waste gases in the unburnt state at the exit from an oxygen blowing converter to use the CO gas contained in them for valuable purposes. This is normally done by a waste gas recovery apparatus.

A typical recovery apparatus is illustrated schematically in FIG. 3, which is connected to a converter 1 for steel production to draw the waste gases therefrom. A lance 11 is provided for blowing pure oxygen onto the bath of molten pig iron within the converter 1. As is well known, the operation of a converter comprises the three process steps of charging, blowing and discharging. In the blowing step, pure oxygen is blown through an oxygen lance or jet into molten metal in the converter to accomplish refining. The oxygen thus blown and carbon contained within the molten metal react to form a large quantity of waste gas composed principally of CO. The recovery apparatus includes a fan 7 which is run to create a draught that draws by suction the waste gases from the converter 1 into a gas cooler 4.

Dust collectors 5 and 6 are provided to remove the dust contained in the gases before they are conduced to a gas holder 10.

A divergent duct branches off from the main duct at a junction point and is connected at its opposite end to a stack 8. A damper 9 is provided immediately downstream of the junction, in both the main duct and the divergent duct, respectively. When the waste gases are not rich enough in CO content for efficient recovery, as in the initial and final stages of blowing, these dampers 9 are manipulated in such a manner as to guide the waste gases to flow into the divergent duct. The deflected gases are then discharged into the atmosphere through the stack 8, after having being burned at the top portion thereof for complete combustion.

A recovery apparatus is required to be constructed to be a completely airtight structure, mainly for the following two reasons. First, since the waste gases from a converter have a more or less high content of CO, an escape of the waste gas exposes an operator to the possible danger of intoxication, when the operator is in the vicinity of the apparatus. Secondly, admission of atmospheric air into the system can result in a reduction of quantity of the recovered waste gas. In normal practice, to provide a proper seal, a skirt 2 is mounted to enclose about the waste gas outlet where the converter 1 is connected to the gas cooler 4 of the recovery system, at which leak and entrance of atmospheric air are most likely to occur.

Normally, means is provided to move the skirt 2 vertically between a lower position where it closes the waste gas outlet of the converter 1 for waste gas recovery and an upper position where it is held clear out of the way to permit the converter to shift to a tilted position for charging or discharging.

Since the mouth of oxygen blowing converters are rugged on the surface, mainly because of adhered metal and slag accumulated from long operations, the skirt 2 cannot be mounted to enclose the periphery of the converter mouth close enough to provide a physically airtight seal.

Consequently, most of the conventional skirts 2, as illustrated in FIG. 4, are installed at a point some way off from the periphery of the converter mouth 12, with an annular sealing band 11a provided at the lower rim portion of the skirt 2 to give sealing along the external periphery of the converter mouth 12.

However, these converter mouths 12 tend to become irregular on the surface, because of spilt or overflown metal or slag or heat-affected deformations, causing a gap between the sealing band 11a and converter mouth 12.

An improved sealing band was proposed, which is divided into multiple segments of a bandage, each pivotally disposed on a horizontal pivot so that the individual segments can land on the converter mouth 12 at a different angle of tilt thereby closing the rugged mouth surface.

This improved sealing band, however, has been found to pose a serious problem. While efficient to provide proper sealing along the periphery of the converter mouth 12, it causes a gap between the adjacent segments tilted at different angles along their opposite edges.

A further development is shown in FIG. 5, which comprises a double sealing device mounted to enclose about the mouth 13 of the converter 1. A primary sealing assembly consists of an upper annular skirt 2 and a matching intermediate skirt 2' which is brought into contact with the mouth 13. An annular secondary sealing band 15 is provided to encircle the mouth 13 external of the primary sealing assembly. An annular bellows 16 is provided to interconnect the upper and intermediate skirts 2 and 2'. The annular secondary sealing device 15 is connected to the primary sealing assembly by another annular bellows 17.

A hydraulic cylinder 18 is fixedly mounted on the upper annular skirt 2 and has its reciprocable piston secured to the annular secondary sealing device 15. The hydraulic cylinder 18 is actuated to lift up the entire skirt assembly with its primary and secondary sealing means by means of the piston, when the converter 1 has to be tilted for charging or discharging. During the gas recovery operation, on the other hand, the hydraulic cylinder 18 is released to hold the sealing devices 2' and 15 in close contact with the mouths 13 and 14.

A similar skirt sealing device of double structure is illustrated in FIG. 6, which also employs a pair of annular bellows 19 and 20. An intermediate water-cooled annular wall 21 is provided to stand between a portion of skirt 2 comprised of the lower flared end of the skirt which encloses the converter mouth 24 and sealing device 22. This wall 21 is properly cooled enough to allow an overflow of molten slag that might come down the converter mouth 24 to cool to solidification, in order to keep smooth in that outer area of the flanged mouth 24 where the sealing device 22 is held in sealing contact with the mouth surface.

In the last mentioned two conventional devices, although the bellows are employed to insure both sealing and efficient vertical movement of the double sealing device, their frequent use is found to pose serious problems.

For example, dust tends to deposit in the bottoms of the folds in the bellows, with a resultant reduction in the flexing of the bellows. In addition, ideal application requires a bellows to be as thin as possible. However, a bellows made of thin material, exposed to the extremely high temperature environment of steel refining and repeated extension and contraction, tends to degradate in short periods of service life.

SUMMARY OF THE INVENTION

A primary object to the present invention is to provide an improved apparatus for completely sealing the skirt of a converter waste gas recovery system.

An additional object of the present invention is to provide such an apparatus capable of efficient vertical movement relative to the converter mouth.

A further object of the present invention is to provide such an apparatus having means for enhanced cooling.

A still further object of the present invention is to provide such an apparatus with increased service life.

The above and other objects, features and advantages of the present invention will be more fully understood and appreciated from the following description of a specific embodiment taken together with the accompanying drawings.

DETAILED DESCRIPTION OF PREFERRED EMBODIMENTS

Figure 1:
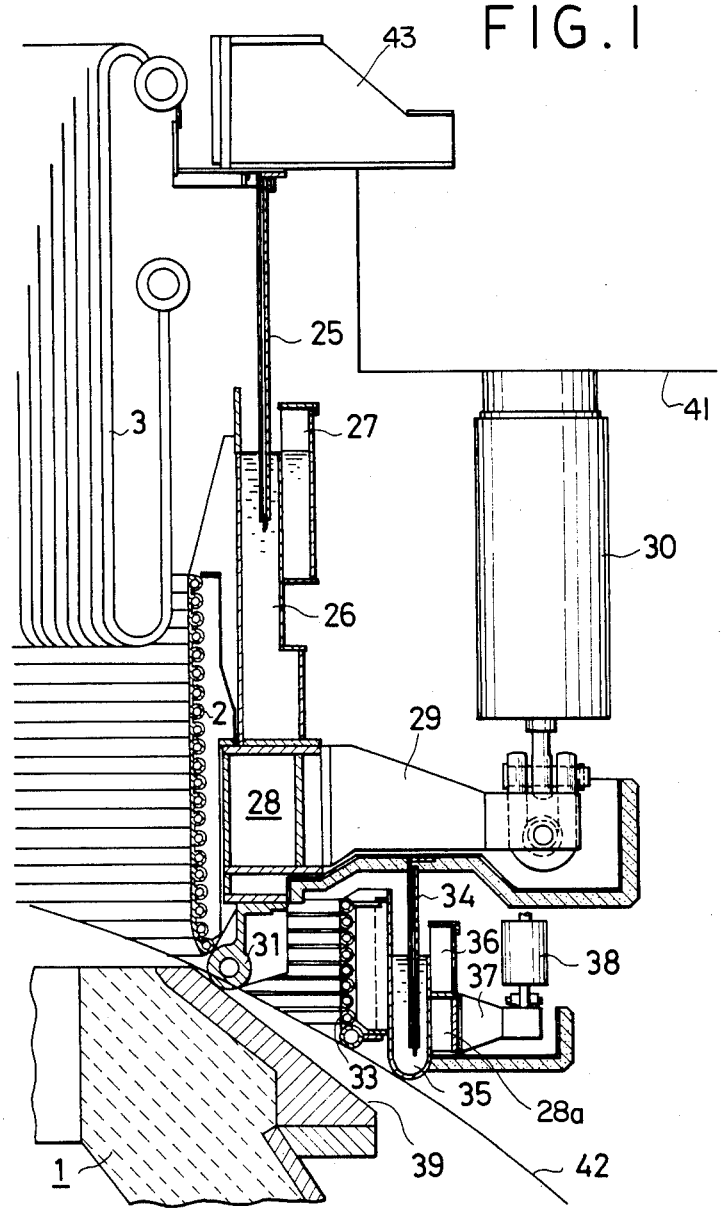
FIG. 1 is a side cross-section view of a preferred embodiment of the present invention.
Figure 2:
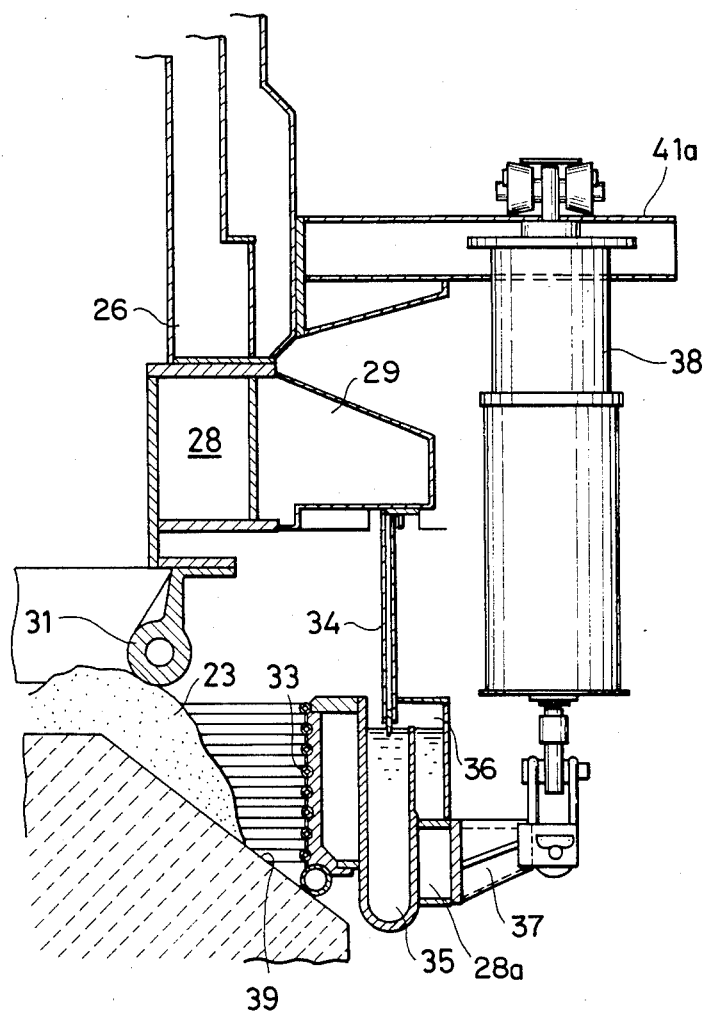
FIG. 2 is a side cross-section view of the embodiment shown in FIG. 1, showing the important part thereof.
Figure 3:
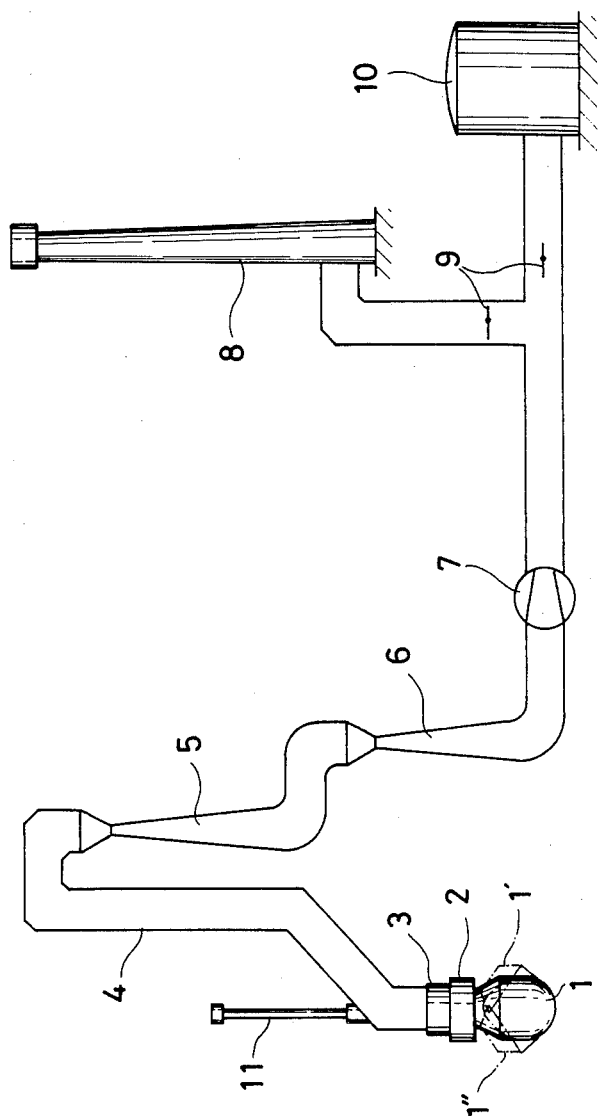
FIG. 3 is a schematic view showing the overall structure of a waste gas recovery apparatus for oxygen blowing converters.
Figure 4:
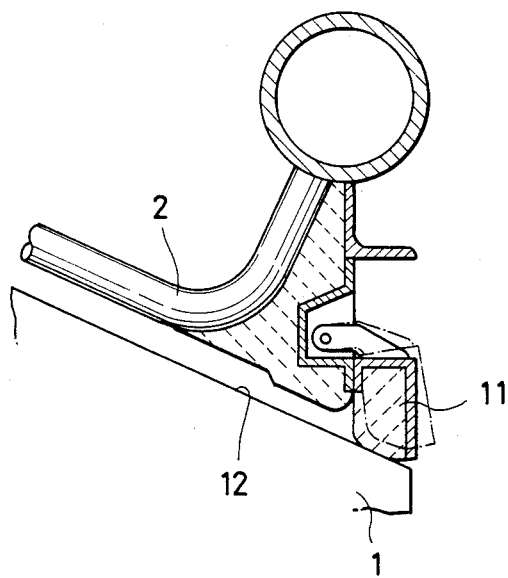
FIG. 4 is a side cross-sectional view of an example of the conventional waste gas recovery apparatus, showing the single annular sealing device along the periphery of the converter mouth.
Figure 5:
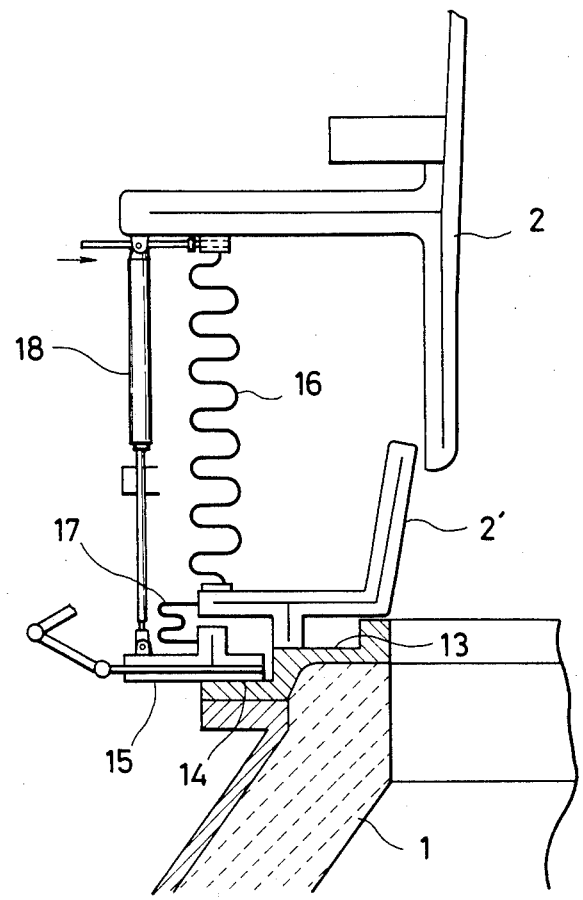
FIGS. 5 and 6 are respectively a side cross-section view of different examples of the conventional waste gas recovery apparatus with a double sealing device using bellows for sealing.
Figure 6:
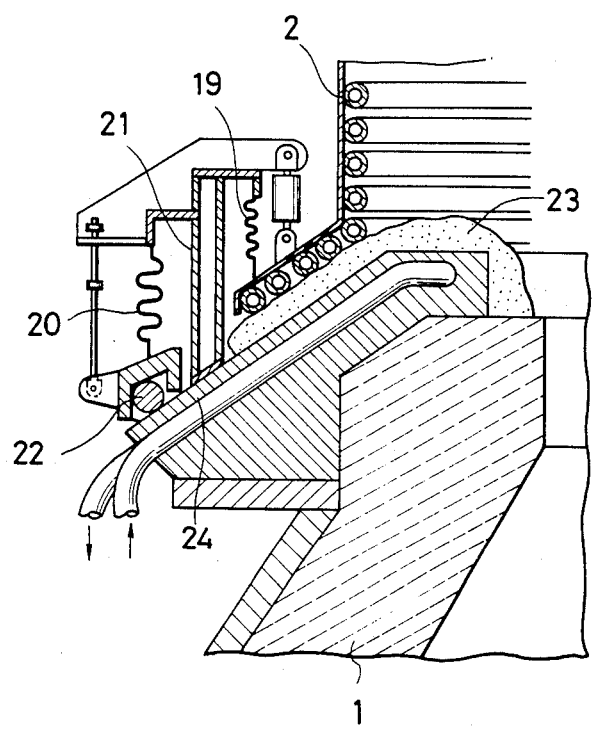

Referring to FIGS. 1 and 2, a waste gas recovery system includes a lower hood 3 for collecting the waste gases from an oxygen blowing converter 1. A skirt 2 is fixedly secured to a primary supporting member 28 provided to enclose about the periphery of a converter mouth 39. The skirt 2 may preferably be made of a tube formed into a coil and fluid communication with a source of coolant, not shown, which supplies a flow of coolant through the tube to cool the heat of the waste gases from the mouth 39 of the converter 1 in operation. The primary supporting member 28 is vertically moved relative to the converter mouth 39 by a primary hydraulic cylinder 30 via a primary bracket 29 interconnected between the primary supporting member 28 and the reciprocable piston of the primary hydraulic cylinder 30, which in turn is secured at its top part to a stationary rigid structure 41. A hollow primary sealing plate 25 is installed to encircle the skirt 2 and the lower hood 3 to provide sealing between the skirt 2 and the lower hood 3, with its upper end being stationarily secured to the rigid structure 41 through a member 43. A lower portion of the primary sealing plate 25 is inserted into a primary sealing jacket 26, which is filled with water to such a level that the inserted end of the primary sealing plate 25 is partly submerged in the sealing water. Thus, the primary sealing plate 25, along with the primary sealing jacket 26, is properly sealed in the presence of the sealing water.

The primary sealing jacket 26 may be connected to a source of water which is provided to replenish the primary sealing jacket 26. Preferably, an overflow port 27 is mounted on an upper part of the primary sealing jacket 26 and is maintained at a constant water level in the primary sealing jacket 26.

A primary sealing device 31 is secured to the skirt 2 along a lower periphery thereof and installed to provide sealing between the skirt 2 and the converter mouth 39.

Referring then to FIG. 2 a secondary sealing device 33 is installed to enclose the primary sealing device 31 and has its lower part built for sealing contact with the surface of the converter mouth 39. Connected to the secondary sealing device 33 is a secondary sealing jacket 35 which is filled with sealing water and connected to a source of water which is provided to replenish the secondary sealing jacket 35. A secondary sealing plate 34 is installed to encircle the secondary sealing device 33 and has its lower end submerged in the sealing water of the secondary sealing jacket 35. Thus, the secondary sealing device 33, along with the secondary sealing plate 34, is properly sealed and cooled in the presence of the sealing water against the heat from the converter. Preferably, the secondary sealing device 33 is installed along a diameter that may be out of reach of the possible overlfow of molten slag from the converter mouth 39.

Also, an overflow port 36 is mounted on an upper part of the secondary sealing jacket 35 to maintain a constant water level in the secondary sealing jacket 35. The secondary sealing device 33 with the secondary sealing jacket 35 is supported by a secondary supporting member 28a. The secondary supporting member 28a is individually operatively connected via secondary bracket 37 to a secondary hydraulic cylinder 38 via its reciprocable piston which moves the secondary sealing device 33 vertically relative to the converter mouth 39. Preferably, the secondary hydraulic cylinder 38 is secured to a rigid structure which in turn is affixed to the support member 28 for movement therewith when the hydraulic cylinder 30 is actuated. The secondary sealing plate 34 is also secured at its top end to the underside of the primary bracket 29 to provide sealing between the primary sealing device 31 and the secondary sealing device 33.

Furthermore, referring to FIG. 1, the secondary sealing device 33 can be moved to a height relative to the primary sealing device 31 by the secondary hydraulic cylinder 38, independent of the operation of the primary hydraulic cylinder 30. The relative height of the secondary sealing device 33 to the primary sealing device 31 in their initial positions, is determined by the form of the design of the converter 1 and the locus 42 of its converter mouth 39 takes when the converter 1 is tilted for charging or discharging, as will later be described in detail.

In operation, the primary hydraulic cylinder 30 first is operated to lower the primary supporting member 28 until the primary sealing device 31 lands on the surface of the converter mouth 39 so as to provide sealing between the lower hood 3 and the converter 1. At this moment, the secondary sealing device 33 which is also moved by the hydraulic cylinder 30 is still held some way off from the mouth, as shown in FIG. 1, where the secondary sealing device 33 stands clear out of the way of the converter 1 to allow it to shift to its tilted position for charging or discharging. To provide a double sealing design, therefore, the secondary hydraulic cylinder 38 has to be actuated to bring the secondary sealing device 33 to further fall into sealing contact with the surface of the converter mouth 39.

This capability of moving the secondary sealing device 33 independently of the primary sealing device 31 would be more advantageous when the converter mouth 39 has become rugged on the surface because of adhered slag 23 from continued operations, as shown in FIG. 2.

In this case, the primary sealing device 31 is lowered to a horizontal plane defined by the peaks of such slag deposit 23. After the sealing position of the primary sealing device 31 is determined, the second hydraulic cylinder 38 is actuated to lower the secondary sealing device 33 into contact with the converter mouth 39. When there might possibly be gaps between the top surface of the slag deposit 23 and the primary sealing device 31, complete sealing is insured by the secondary sealing device 33.

When the converter 1 is tilted for charging or discharging, the secondary hydraulic cylinder 38 is operated to raise the secondary sealing device 33 to its initial position to permit the converter to tilt without touching the secondary sealing device 33.

It will be easily seen from the above that the double sealing design of this invention invariably insures efficient sealing even if the converter mouth 39 is covered with a considerable deposit of slag. In addition, the two water jackets can serve to effectively cool the entire skirt with its sealing devices increasing their life. Furthermore, since the primary sealing device can be lowered independently of the secondary sealing device, tilting the converter for charging or discharging can be effected with increased ease and safety.

Various changes and modifications may be possible from the present invention for those versed in the art. It is to be understood that this invention should be limited, not by the particular embodiments and drawings, but by the scope of the appended claims.

What is claimed is:

1. An apparatus for sealing a skirt of a converter waste gas recovery system, said skirt being vertically disposed for movement between a hood of a waste gas recovery system and a mouth of the converter, comprising:

a vertically movably disposed primary sealing means adapted to provide primary gas tight sealing for the skirt and a vertically movably disposed secondary sealing means adapted to provide secondary gas tight sealing;

the primary sealing means comprising in combination a primary sealing device of annular construction fixedly secured to a lower circular edge of the skirt, a primary supporting member fixedly secured to said primary sealing device, and a primary hydraulic cylinder operatively connected to said primary supporting member in such a manner as to move via said primary supporting member said primary sealing device and hence the skirt between an upper position and a lower sealing position where said primary sealing device is brought into contact with the converter mouth; and the secondary sealing means comprising in combination a secondary sealing device of generally cylindrical construction mounted externally of said primary sealing device, a secondary supporting member fixedly secured to said secondary sealing device, and a secondary hydraulic cylinder operatively connected to said secondary supporting member in such a manner as to move via said secondary supporting member said secondary sealing device between an upper position and a lower sealing position where said secondary sealing device is brought into contact with the converter mouth.

2. An apparatus as set forth in claim 1, wherein said primary sealing means further comprises a primary sealing jacket of hollow construction having a cylindrical space between opposite walls thereof and mounted to encircle said primary sealing device, said primary sealing jacket being filled with water up to a predetermined level, and a stationary primary sealing plate of cylindrical construction provided to extend above said primary sealing jacket encircling said primary sealing device and having substantially the same diameter as said primary sealing jacket such that said primary sealing plate has its lower end submerged in the water below said level in said primary sealing jacket, said primary sealing jacket being provided with an overflow port to receive excess water from said primary sealing jacket thereby maintaining said level of water in said primary sealing jacket.

3. An apparatus as set forth in claim 2, wherein said primary sealing plate extends upward to a point where said primary sealing plate encloses the skirt and hood of the waste gas recovery system in a gas tight condition in conjunction with said primary sealing jacket.

4. An apparatus as set forth in claim 1 or 2, wherein said secondary sealing means further comprises a secondary sealing jacket of hollow construction having a cylindrical space between opposite walls thereof and mounted to encircle said secondary sealing device, said secondary sealing jacket being filled with water up to a predetermined level, and a stationary secondary sealing plate of cylindrical construction provided to extend above said secondary sealing jacket encircling said secondary sealing device and having substantially the same diameter as said secondary sealing jacket such that said secondary sealing plate has its lower end submerged in the water below said level in said secondary sealing jacket, said secondary sealing jacket being provided with an overflow port to receive excess water from said secondary sealing jacket thereby maintaining said level of water in said secondary sealing jacket.

5. An apparatus as set forth in claim 4, wherein said secondary sealing plate is affixed at its upper end to the said primary sealing means in such a manner to isolate from the ambience an inside space defined by said secondary sealing plate and secondary sealing jacket.

* * * * *